United States Patent
Amberkar et al.

[11] Patent Number: 6,062,336
[45] Date of Patent: May 16, 2000

[54] ADAPTIVE VARIABLE EFFORT POWER STEERING SYSTEM

[75] Inventors: Sanket Suresh Amberkar, Saginaw; Yuen-Kwok Chin; William Chin-Woei Lin, both of Troy; Jeffery Alan Zuraski, Saginaw, all of Mich.

[73] Assignee: General Motors Corporation, Detroit, Mich.

[21] Appl. No.: 09/191,600

[22] Filed: Nov. 13, 1998

[51] Int. Cl.$^7$ ..................................................... B62D 5/04
[52] U.S. Cl. .......................... 180/443; 180/446; 701/41; 701/42
[58] Field of Search .................................. 180/446, 443; 701/41, 42

[56] References Cited

U.S. PATENT DOCUMENTS

| | | | |
|---|---|---|---|
| 4,905,783 | 3/1990 | Bober | 180/142 |
| 5,261,503 | 11/1993 | Yasui | 180/142 |
| 5,388,658 | 2/1995 | Ando et al. | 180/197 |
| 5,428,536 | 6/1995 | Ackermann | 364/424.05 |
| 5,446,657 | 8/1995 | Ikeda et al. | 364/424.05 |
| 5,606,502 | 2/1997 | Adachi et al. | 364/424.045 |
| 5,642,281 | 6/1997 | Ishida et al. | 364/424.051 |
| 5,648,903 | 7/1997 | Liubakka | 364/424.051 |
| 5,684,700 | 11/1997 | Crocker | 364/424.051 |
| 5,742,919 | 4/1998 | Ashrafi et al. | 701/70 |
| 5,805,449 | 5/1999 | Ito | 364/424.051 |
| 5,845,222 | 12/1998 | Yamamoto et al. | 701/41 |
| 5,853,064 | 5/1999 | Hackl. et al. | 180/422 |
| 5,904,223 | 5/1999 | Shimizu et al. | 180/443 |

OTHER PUBLICATIONS

SAE Power Steering System with Traveling Condition Judgement Function; Nakamura et al.; Sep. 1989.
SAE Study on Suitable Steering Feeling for Various Driving Conditions; Suzuki et al.; Oct. 1994.
SAE Motor Driven Power Steering for the Maximum Steering Sensation in Every Driving Situation; Iga et al.; 1988.

*Primary Examiner*—Christopher P. Ellis
*Assistant Examiner*—Rashmi Sharma
*Attorney, Agent, or Firm*—Edmund P. Anderson

[57] ABSTRACT

An adaptive, variable effort power steering system is responsive signals from one or more low friction road surface vehicle handling controls which indicate when the system has become active in modifying handling, and thus indicates the existence of a near limit or at limit vehicle handling situation. Such controls include anti-lock braking systems (ABS), traction control systems (TCS) and integrated chassis control systems (ICCS). When such a handling limit signal is received, the power steering system responds by decreasing steering assist to provide a more "manual" steering feel as long as the handling limit situation is indicated. The handling limit signal may be a binary signal, indicating activity or no activity of an anti-lock brake system, traction control system or a chassis control system such a yaw rate control. Alternatively, or in addition, the handling limit signal may be a magnitude signal indicating the degree or amount of yaw rate error, lateral acceleration error, wheel slip or vehicle side-slip and thus potentially anticipating the vehicle handling limit as indicated by a binary signal. If binary and magnitude signals are used together, the magnitude signal is preferably used as an anticipatory signal with a partial and growing correction to smooth the application of the full correction signaled by the binary signal.

11 Claims, 4 Drawing Sheets

ADAPTIVE VARIABLE EFFORT POWER STEERING SYSTEM

TECHNICAL FIELD

The technical field of this invention is an adaptive, variable effort, vehicle power steering system.

BACKGROUND OF THE INVENTION

Basic power steering systems provide a fixed steering assist offset curve regardless of driving conditions. Some recently appearing power steering systems, however, provide apparatus capable of changing power steering effort in different driving situations. For example, one such system, marketed by Delphi Automotive Systems, provides a decrease in steering assist with vehicle speed, so that great assist will be provided at very low speed vehicle maneuvers such as parking, while significantly less assist is provided at high speed highway driving for a tighter, "manual steering feel" and greater stability. In a recent variation of this system, a variation responsive to estimated lateral acceleration has been added to improve steering linearity.

Such improvements enhance vehicle steering feel and performance during normal handling of the vehicle, when there is good friction between the road surface and vehicle tires. But handling near or at the limit, when road surface friction is significantly decreased, may often require a different adjustment in steering assist.

SUMMARY OF THE INVENTION

The adaptive, variable effort power steering system of this invention takes advantage of the advent of vehicle low friction road surface handling controls for vehicle brakes and/or suspension components to provide special control of power steering assist near or at the limit of vehicle handling. Such controls include anti-lock braking systems (ABS), traction control systems (TCS) and integrated chassis control systems (ICCS). Each of these systems provides sensors indicating when a vehicle approaches or reaches a vehicle handling limit, usually due to reduction in road surface friction, and one or more actuators capable of overriding normal vehicle control while the normal handling is not optimal. The power steering system of this invention is responsive to signals from one or more of such systems which indicate when the system has become active in modifying handling, and thus indicate the existence of a near limit or at limit vehicle handling situation. When such a handling limit signal is received, the power steering system responds by decreasing steering assist to provide a more "manual" steering feel as long as the handling limit situation is indicated.

Thus, the adaptive variable power steering system of the invention controls steerable wheels of a vehicle operating on roads having variable road surface friction and including a low friction road surface vehicle handling control responsive to reduction in friction between the steerable wheels and the road surface to generate a handling limit signal. The power steering system is provided with means for generating an assist torque in response to sensed handwheel input torque and means responsive to the low friction road surface vehicle handling control for reducing the assist torque during the generation of the handling limit signal.

The handling limit signal may be a binary signal, indicating activity or no activity of an anti-lock brake system, traction control system or a chassis control system such a yaw rate control. Alternatively, or in addition, the handling limit signal may be a magnitude signal indicating the degree or amount of yaw rate error, lateral acceleration error, wheel slip or vehicle side-slip and thus potentially anticipating the vehicle handling limit as indicated by a binary signal. If binary and magnitude signals are used together, the magnitude signal is preferably used as an anticipatory signal with a partial and growing correction to smooth the application of the full correction signaled by the binary signal.

DESCRIPTION OF THE PREFERRED EMBODIMENT

Figure 1:
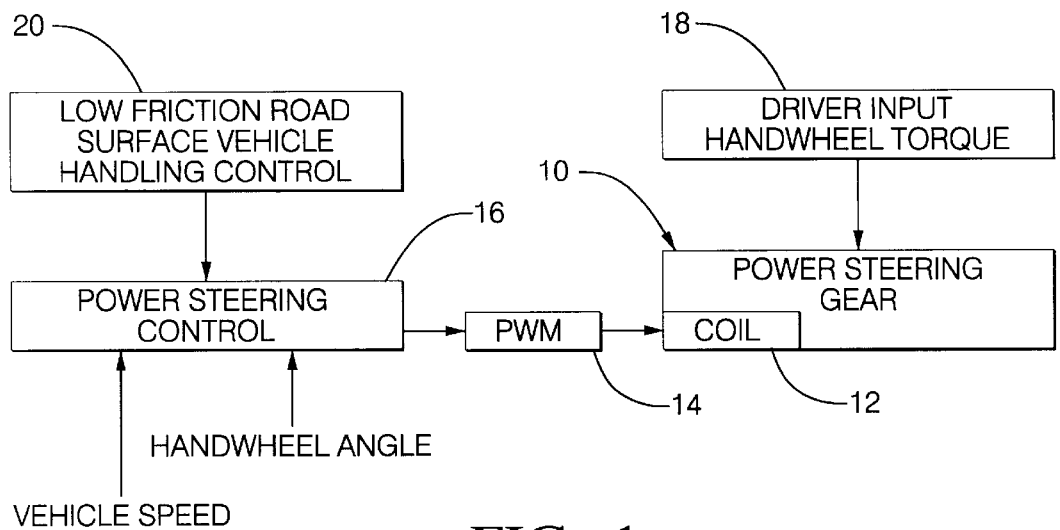
FIG. 1 is a block diagram of a vehicle power steering system according to the invention.

Referring to FIG. 1, a vehicle power steering gear 10 comprises a rack and pinion steering mechanism controlled by a handwheel with a power assist apparatus responsive to driver input handwheel torque and a control signal to control the direction of vehicle steerable wheels, not shown. Power steering gear may be any such mechanism known in the art, and may provide hydraulic or electric power assist. A suitable mechanism for vehicle power steering gear is shown, for example, in U.S. Pat. No. 5,119,898, Electromagnetic Control Apparatus for Varying the Driver Steering Effort of a Hydraulic Power Steering System, issued Jun. 9, 1992 to Eckhardt et al, the disclosure of which is incorporated by reference. In the mechanism of this prior art patent, a pulse width modulated (PWM) control current is provided to a coil 12 for the generation of electromagnetic torque to modify the hydraulic assist torque generated within the power steering gear. The input PWM control current thus provides programmed, variable control of steering effort. It should be apparent to those skilled in the art that the apparatus of the invention would also be easily adaptable to any electronically controlled power steering system. In an electric power steering (EPS) system, for example, a signal indicating a correction current (torque in rotary electromagnetic devices) could be combined, such as by addition, with other such signals in the EPS control.

The PWM control current is generated by a PWM circuit apparatus 14 of known construction in response to an output signal from a power steering control 16, which may, as suggested in U.S. Pat. No. 5,119,898, be based on a programmed digital microcomputer. Thus, the program in power steering control 16 provides an output signal to PWM generating circuit 14, which provides a control current to coil 12 of power steering gear 10 to modify the power assist thereof to the driver input handwheel torque 18, provided by the vehicle operator through the handwheel.

Power steering control 16 receives several input signals required by the program. A vehicle speed signal is provided in a known manner from the vehicle's speedometer apparatus or otherwise from vehicle undriven wheel speed. A handwheel angle signal is likewise provided from a suitable sensor. A vehicle handling limit signal is provided from a low friction road surface vehicle handling control 20. Control 20 may be any control which is responsive to vehicle dynamics or wheel spin to provide special control of a vehicle chassis actuator such as brakes, suspension, etc. in response to sensed low road surface friction. Examples of such a system include a vehicle anti-lock brake system (ABS) or a vehicle traction control system (TCS), in which vehicle brakes are automatically modulated when vehicle wheel slip is sensed. Another example is a vehicle chassis control system (CCS) in which the vehicle brakes or a vehicle suspension actuator is used to correct inappropriate vehicle yaw or other dynamic behavior associated with loss of traction between the vehicle wheels and the road surface. Each of these systems is designed to provide active control of the vehicle only during a period when vehicle dynamic behavior associated with loss of road friction is sensed; and this invention provides that a signal of this activity is provided as the output from the low friction road surface handling control 20 to power steering control 16. In this embodiment, this signal is a binary bit indicating activity or no activity, although a signal indicating a degree of activity could be used if such were determinable within control 20. Thus, for example, such a signal from an anti-lock brake system would be in a first state, indicating activity, and thus a vehicle handling limit, only while actually modulating brake pressure, and would otherwise be in a second state indicating normal vehicle handling.

Figure 2:
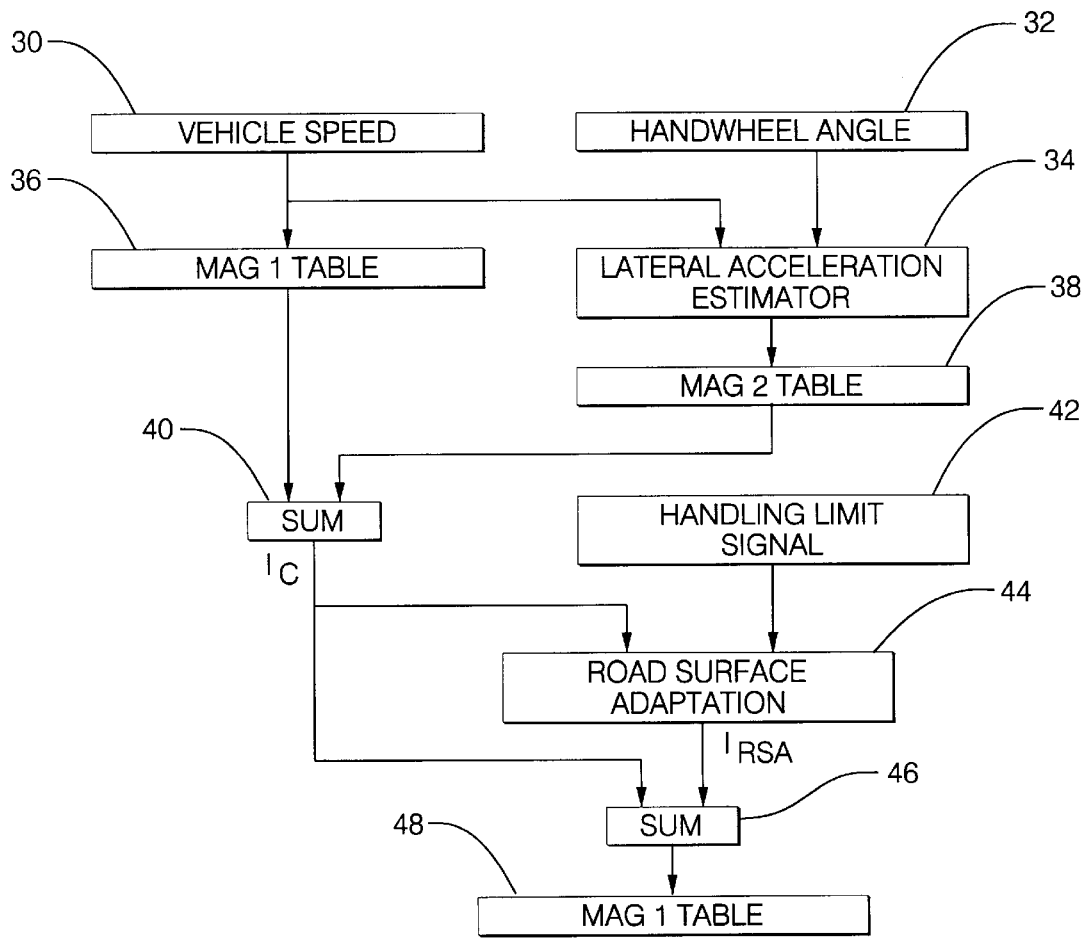
FIG. 2 is a block diagram of a power steering control for use in the vehicle power steering system of FIG. 1.

Power steering control 16 is shown in more detail, in block diagram form, in FIG. 2. A vehicle speed signal 30 is provided to a MAG1 look-up table 36, which outputs a vehicle speed correction value $I_{VS}$. The values stored in MAG1 look-up table 36 are calibrated to produce a current in coil 12 which produces high steering assist at very low vehicle speeds, for easier vehicle parking and similar low speed maneuvers, but which increases, and thus reduces steering assist, at high vehicle speeds for a more manual steering feel and improved steering stability at highway speeds.

Vehicle speed signal 30 and a vehicle handwheel angle signal 32 are provided to an estimated vehicle lateral acceleration block 34 to derive an estimated vehicle lateral acceleration signal, which is provided to a MAG2 look-up table 38; and the latter outputs a vehicle lateral acceleration correction value $I_{LA}$. The values stored in $MAG_2$ look-up table 38 are calibrated to provide a current in coil 12 which increases, and therefore reduces steering assist, with lateral acceleration, thus improving steering linearity between steering effort and vehicle motion.

Values $I_{VS}$ and $I_{LA}$ are added in summer 40 to produce a value $I_C$. This value is provided to a road surface adaptation block 42, which also receives the handling limit signal 44 from low fiction road surface vehicle handling control 20, and derives therefrom a road surface correction value $I_{RSA}$. The road surface correction value $I_{RSA}$ is added to $I_C$ in summer 46 to provide the total current signal $I_{MAG}$, which is slew limited in slew limit block 48 to produce the output signal of power steering control 16 provided to PWM circuit 14. The slew limiting is required to limit the rate of power assist decrease, in response to the sudden application of such a decrease in response to a binary handling limit signal, so that it is not annoying to the vehicle operator.

Figure 3:
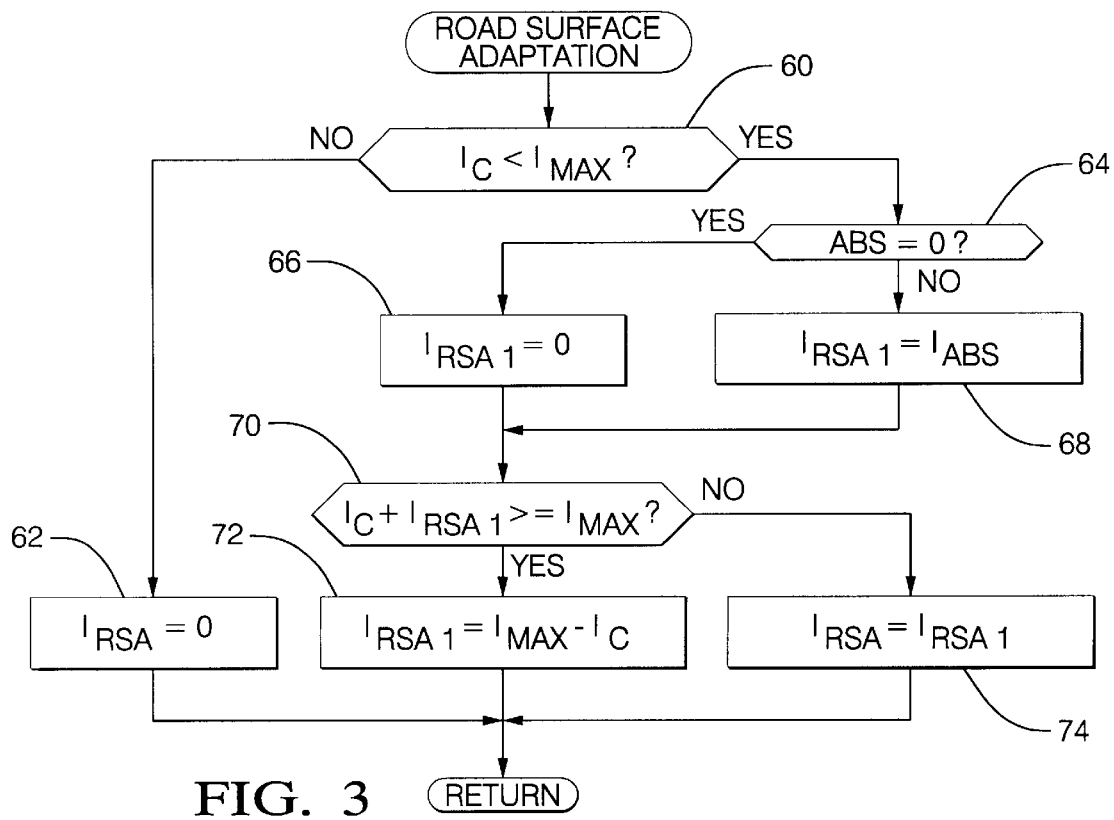
FIG. 3 is a block diagram of a road surface adaptation derivation for use in the power steering control of FIG. 2.

Road surface adaptation block 42 is described in more detail with respect to the flow chart of FIG. 3. $I_C$ is compared with a reference value $I_{MAX}$ in step 60. $I_{MAX}$ is a stored constant representing the maximum total current allowed. If $I_C$ is not less than $I_{MAX}$, the maximum current would be exceeded with any additional amount from the road surface adaptation, so the output value $I_{RSA}$ is set equal to zero at step 62.

If $I_C$ is less than $I_{MAX}$, then an RSA correction is possible. At step 64, the vehicle handling limit signal ABS is compared with zero at step 64. If it is equal to zero, an intermediate value $I_{RSA1}$ is set equal to zero at step 66. If not, at step 68 $I_{RSA1}$ is set equal to a stored value $I_{ABS}$, which represents a calibrated RSA correction. If signal ABS is a binary signal (0,1 only), then $I_{ABS}$ may be a single stored value; otherwise, a look-up table may be used.

From either of steps 66 and 68, the corrected value $IC+I_{RSA1}$ is compared with $I_{MAX}$ at step 70. If it is greater, than the calibrated correction must be limited to $I_{MAX}-I_C$ in step 72. But if it is not greater, than $I_{RSA}$ is set equal to $I_{RSA1}$, which is either zero or the full calibrated value $I_{RSA}$.

Figure 4:
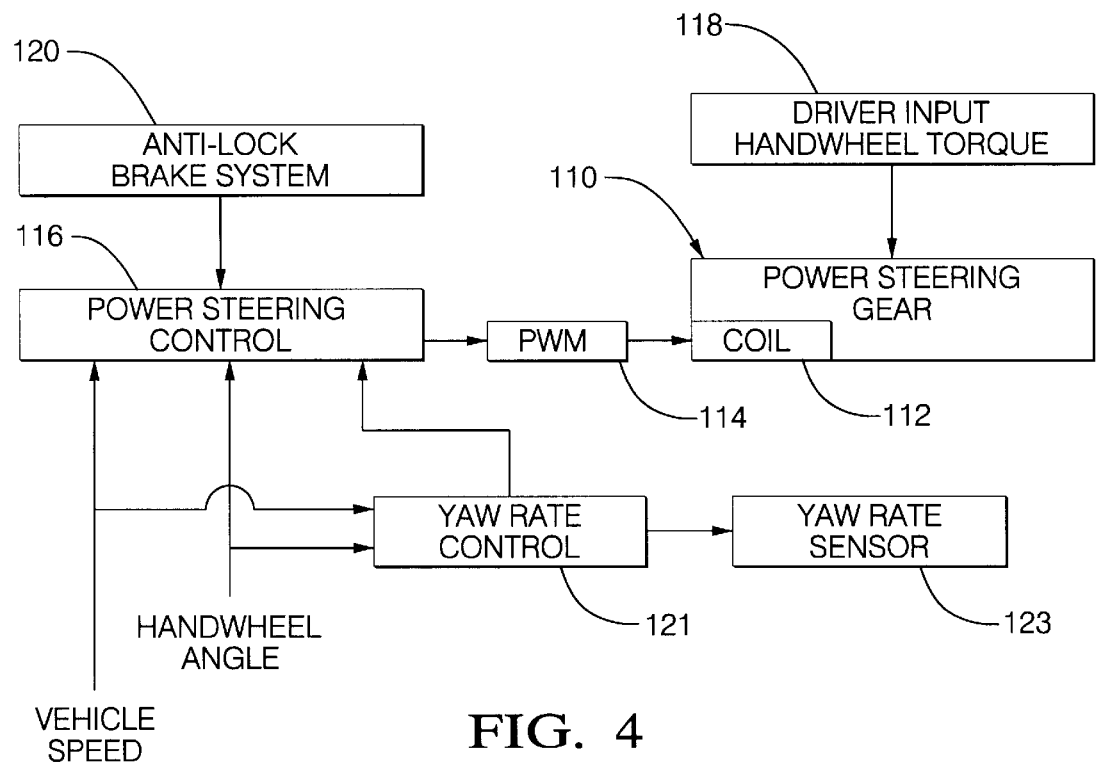
FIG. 4 is a block diagram of another vehicle power steering system according to the invention.

Another embodiment of the invention is shown in FIG. 4, which shows specific examples of two types of low friction road surface vehicle handling controls. An anti-lock braking (ABS) system 120 produces a binary (activated or not activated) handling limit signal as previously described with reference to the embodiment of FIGS. 1–3. A yaw rate control 121 also provides a handling limit signal, which is of a different nature. Yaw rate control 121 is responsive to vehicle speed and handwheel angle to generate a predicted vehicle yaw rate. It is also responsive to a yaw rate sensor 123 to determine or estimate (from wheel speeds of undriven wheels, for example) the actual vehicle yaw rate. In its operation, yaw rate control 121 compares the predicted yaw rate to the actual yaw rate and derives a yaw rate error value. Vehicle brakes and/or other handling controls may be actuated in a predetermined manner to reduce or eliminate the yaw rate error. The yaw rate error signal itself, however, comprises a handling limit signal with a magnitude indicating the degree or amount of error and is anticipatory: that is, it is capable of indicating that the vehicle is approaching its handling limit. Thus, this embodiment demonstrates how to combine binary and magnitude handling limit signals as well as how to combine such signals which indicate approach to the vehicle handling limit with those that signal only when the vehicle handling limit is reached. In this document, the word "magnitude" is used to indicate that the signal has a magnitude: that is, more than two possible values which are indicative of size or degree, although it has only one value at a time. It should be apparent that other binary signals, such as a TCS signal indicating traction control system activity or a CCS signal indicating a coordinated chassis control system activity, could be substituted for the ABS signal as previously mentioned and other magnitude signals, such as lateral acceleration, wheel slip or vehicle side slip, could be used in place of yaw rate.

The remainder of FIG. 4 is similar to FIG. 1 in that the output of power steering control 116 is provided a PWM circuit apparatus 114; and the latter provides a control current to coil 112 of power steering gear 110 to modify the power assist thereof to the driver input handwheel torque 118, provided by the vehicle operator through the handwheel.

Figure 5:
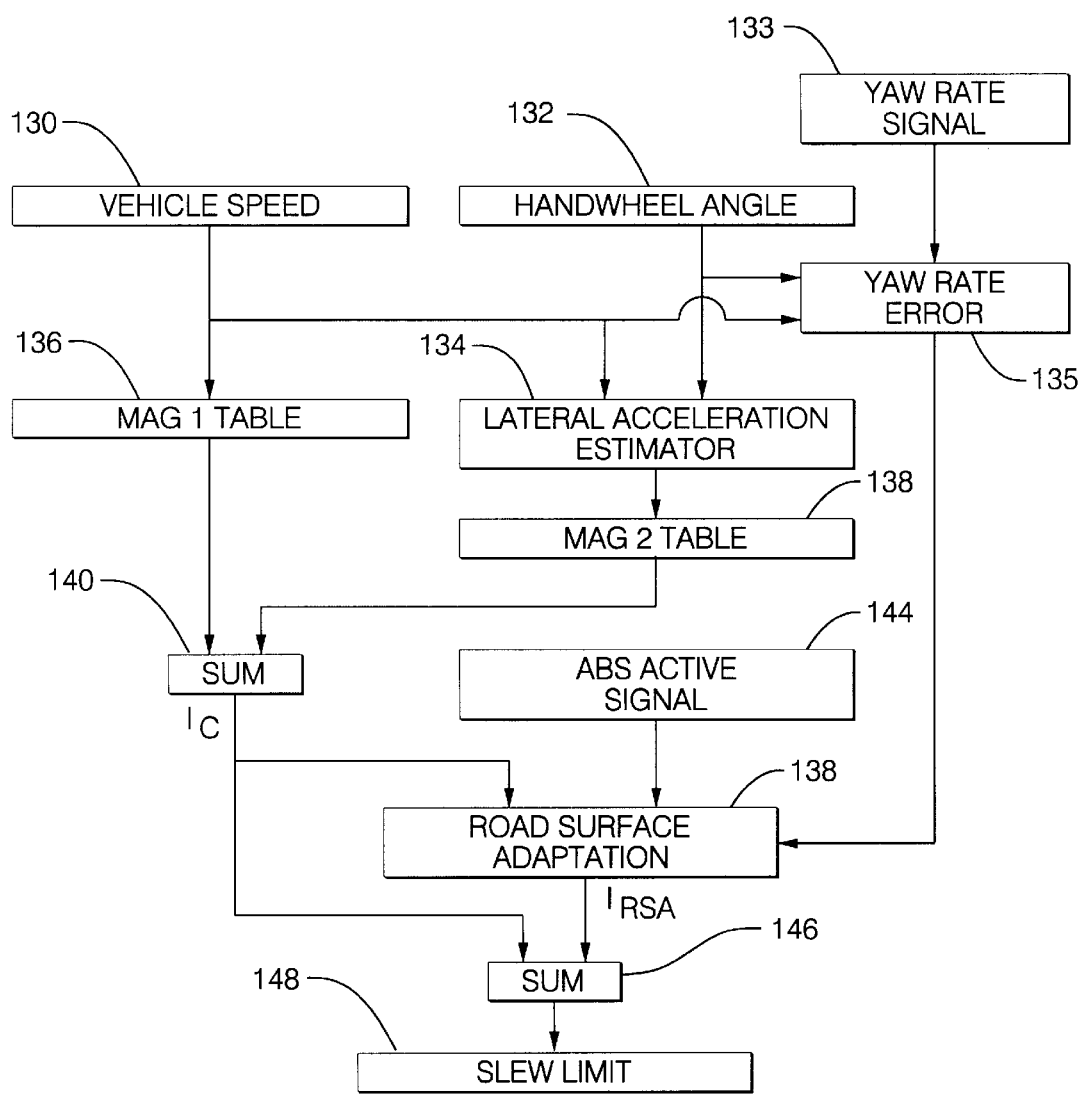
FIG. 5 is a block diagram of a power steering control for use in the vehicle power steering system of FIG. 4.

Power steering control 116 is shown in more detail, in block diagram form, in FIG. 5. In addition to being provided to MAG1 look-up table 136 and lateral acceleration estimator 134, a vehicle speed signal 130 is provided to a yaw rate error estimator 135. Likewise, the handwheel angle signal 132 is provided to yaw rate error estimator 135 as well as vehicle lateral acceleration estimator 134. The actual yaw rate signal 133, whether sensed directly or derived from undriven wheel speeds, is also provided to yaw rate error estimator 135, which derives a yaw rate error correction $I_{YR}$ and provides it to road surface adaptation block 142. The vehicle lateral acceleration signal from estimator 134 is used to extract a vehicle lateral acceleration correction value $I_{LA}$ from MAG2 look-up table 138. As in the embodiment of FIG. 2, values $I_{VS}$ and $I_{LA}$ are added in summer 140 to produce a value $I_C$ that is also provided to road surface adaptation block 142, as is the binary ABS active signal 144 from anti-lock brake system 120. The road surface correction value $I_{RSA}$ output from block 142 is added to $I_C$ in summer 146 to provide the total current signal $I_{MAG}$, which is slew limited in slew limit block 148 to produce the output signal of power steering control 116 provided to PWM circuit 114.

Figure 6:
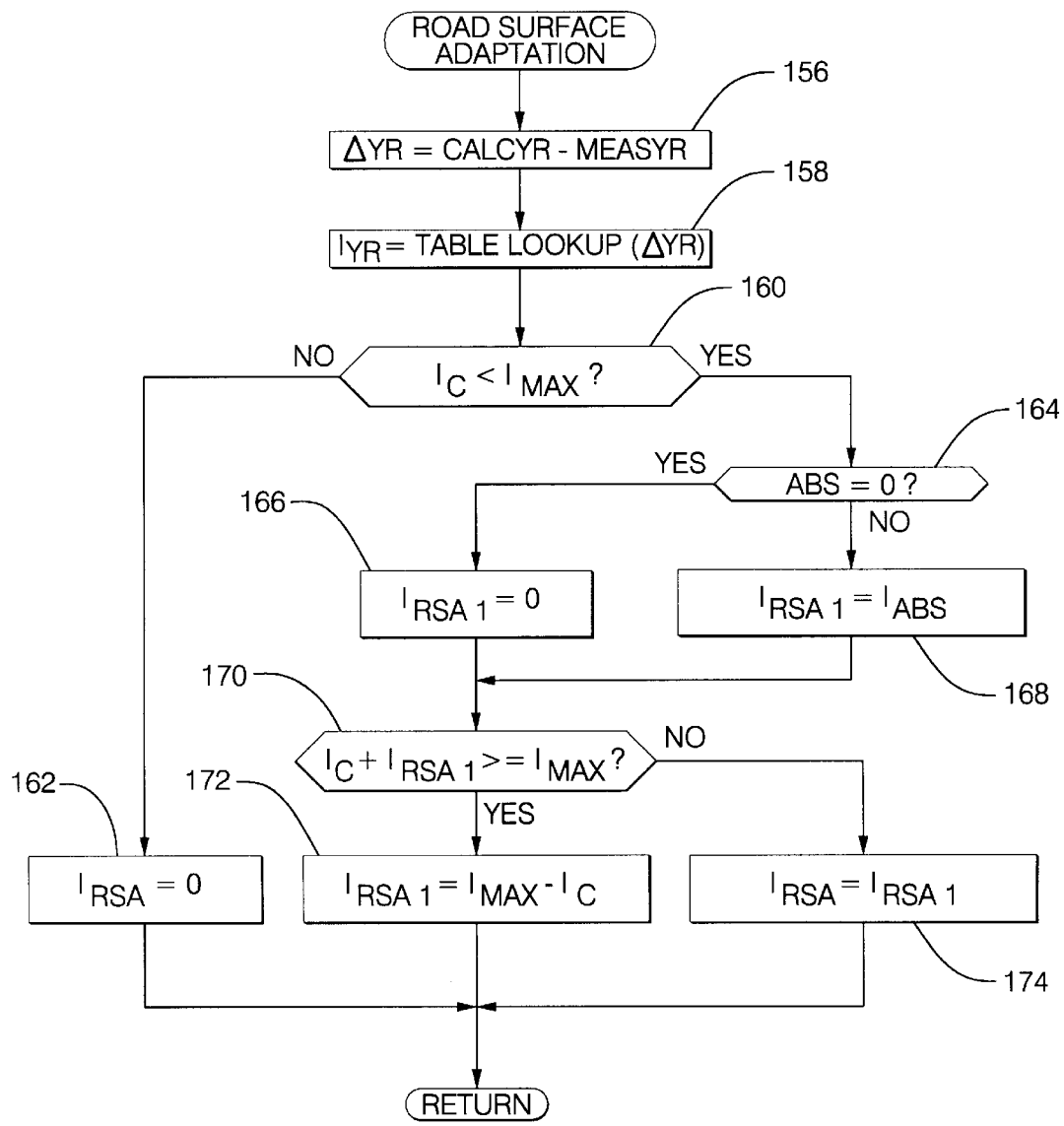
FIG. 6 is a block diagram of a road surface adaptation derivation for use in the power steering control of FIG. 5.

Road surface adaptation block 142 is described in more detail with respect to the flow chart of FIG. 6. This flow chart starts with two steps corresponding to the operation of yaw rate error estimator 135. At step 156, a yaw rate error ΔYR is calculated by subtracting the measured yaw rate MEASYR (sensed or estimated from undriven wheel speeds) from the predicted yaw rate CALCYR (from vehicle speed and handwheel angle). At step 158, a table look-up on yaw rate error ΔYR produces a yaw rate error correction $I_{YR}$. The remainder of the flow chart describes the operation of road surface adaptation block 142, which is similar to that of corresponding block 42 of FIG. 3 except that, instead of setting $I_{RSA1}$=0 as in step 66 of FIG. 3, step 166 sets $I_{RSA1}$=$I_{YR}$. Thus, if the anti-lock brake system is inactive (ABS=0), the intermediate value IRSA1 will not automatically be zero.

In the embodiment of FIGS. 4–6 described above, the binary signal ABS and the magnitude signal $I_{YR}$ are derived from two separate low friction surface vehicle handling controls. But this is not required. The power steering system of this invention may use binary and magnitude signals from the same low friction surface vehicle handling control or may use a binary signal from a low friction road surface handling control and a magnitude signal from a sensor added to the power steering control itself for this purpose.

Regardless of the sources of the binary and magnitude signals used, the embodiment of FIGS. 1–6 combines the correction values derived therefrom in an over-ride manner. Thus, a correction value of $I_{YR}$ may increase gradually as frictional contact between the road and the vehicle is reduced the ABS system becomes active and the correction value $I_{ABS}$ over-rides the value of $I_{YR}$. In this way, the anticipatory correction derived from the magnitude signal, which signals the approach of the vehicle handling limit, produces a partial but increasing correction until the vehicle handling limit is reached, at which the full correction is applied with the change in the binary signal. Although there may be a step change in the correction value when the over-ride takes place, it is unlikely to be as great as that which would occur without the anticipatory magnitude signal. This reduces the need for slew limiting by slew limit block 148 and speeds the application of the reduction in steering assist.

Some combinations of binary and magnitude signals are closely related in terms of vehicle dynamics; and this is particularly true when they are derived from the same low friction road surface vehicle handling system. For example, the binary signal ABS is closely related to wheel slip, the derivation of the which is central to ABS control. Likewise, the derivation of yaw rate error is clearly central to the operation of a yaw rate control. In such cases, the correction values derived from the magnitude signal (for example, $I_{YR}$) may be advantageously calibrated such that its maximum value is equal to the correction value produced by the binary signal (for example $I_{CCS}$, where CCS is a binary signal indicating yaw rate control activity). In another example, the values of a binary wheel slip correction $I_{WS}$ may be advantageously calibrated such that its maximum value is equal to the correction value $I_{ABS}$ applied upon receipt of signal ABS indicating anti-lock brake system activity. In such cases, the transition may require even less help from slew limit block 148.

What is claimed is:

1. An adaptive variable power steering system for a motor vehicle having steerable wheels for operating on roads having variable road surface friction, the vehicle having a low friction road surface vehicle handling control responsive to reduction in friction between the steerable wheels and the road surface, with means for generating a handling limit signal, the power steering system comprising, in combination:

means for generating an assist torque in response to sensed handwheel input torque; and means responsive to the low friction road surface vehicle handling control to reduce the assist torque during the generation of the handling limit signal.

2. The adaptive variable power steering system of claim 1 in which the low friction road surface vehicle handling control is an anti-lock brake system and the vehicle handling limit signal is generated thereby when it is actively controlling vehicle braking.

3. The adaptive variable power steering system of claim 1 in which the low friction road surface vehicle handling control is a traction control system and the vehicle handling limit signal is generated thereby when it is actively controlling vehicle braking.

4. The adaptive variable power steering system of claim 1 in which the low friction road surface vehicle handling control is a vehicle yaw rate control and the vehicle handling limit signal is generated thereby when it is actively controlling vehicle braking.

5. The adaptive variable power steering system of claim 1 in which the handling limit signal provided by the low friction road surface vehicle handling control is a binary limit handling signal indicating a vehicle handling limit when the low friction road surface vehicle handling control is over-riding normal vehicle handling by actively controlling a vehicle handling related system, the system further comprising means for providing a magnitude signal indicating a gradual approach to the limit of vehicle handling.

6. The adaptive variable power steering system of claim 5 in which the low friction road surface vehicle handling control is a vehicle anti-lock brake system providing a binary signal of anti-lock brake activity and a magnitude signal indicating an amount of wheel slip.

7. The adaptive variable power steering system of claim 6 in which the reduction in power assist is based on the magnitude signal indicating wheel slip while the binary signal from the anti-lock brake system indicates no anti-lock brake activity but is over-ridden by the binary signal when the latter indicates anti-lock brake activity.

8. The adaptive variable power steering system of claim 5 in which the low friction road surface vehicle handling control is a vehicle yaw rate control system providing a binary signal of yaw rate correction activity and a magnitude signal indicating an amount of yaw rate error.

9. The adaptive variable power steering system of claim 8 in which the reduction in power assist is based on the magnitude signal indicating yaw rate error while the binary signal from the yaw rate control system indicates no yaw rate correction activity but is over-ridden by the binary signal when the latter indicates yaw rate correction activity.

10. The adaptive variable power steering system of claim 5 in which the low friction road surface vehicle handling control is a vehicle anti-lock brake system providing a binary signal of anti-lock brake activity and the means for providing a magnitude signal indicating a gradual approach to the limit of vehicle handling is a yaw rate control system providing a yaw rate error magnitude signal.

11. The adaptive variable power steering system of claim 10 in which the reduction in power assist is based on the yaw rate error magnitude signal while the binary signal from the anti-lock brake system indicates no anti-lock brake activity but is over-ridden by the binary signal when the latter indicates anti-lock brake activity.

* * * * *